3,095,400
PLASTIC COMPOSITIONS HAVING A SPECKLED
APPEARANCE
Carlo F. Martino, Somerville, and John C. Misko, Edison
(Fords), N.J., assignors to Union Carbide Corporation,
a corporation of New York
No Drawing. Filed Nov. 27, 1957, Ser. No. 699,183
13 Claims. (Cl. 260—43)

This invention relates to plastic compositions and articles produced therefrom. More particularly it relates to compositions comprising thermoplastic and thermosetting materials and articles produced therefrom having a novel speckled effect.

Color has been acknowledged to play an important role in consumer acceptance of many products. One of the most attractive to the consumer and therefore one of the most effective uses of color is a speckled effect, wherein a minor proportion of small particles having a color which contrasts with the color of the major proportion of material is incorporated in and dispersed throughout said major proportion of material. This incorporating and dispersing results in a product which is characterized by having numerous, relatively small, discrete, well-defined centers of contrasting color or colors randomly but uniformly distributed therethrough. Such speckled effects have become popular as a means of adding a dramatic touch of color to home decors. Floor and wall tile, ceramic pottery, wall paper, and even paints are now produced with a speckled effect. Widespread use of plastic materials in the home has created a need for plastic articles with a speckled pattern, especially in demand is speckled plastic wall tile.

Ordinary colorants, such as pigments and dyes, are generally not suitable for producing speckled effects. Most of these colorants are supplied in the form of finely ground powders with particle sizes of about 365 mesh or smaller. Particles below about 200 mesh in size are not readily discernible as discrete particles but rather tend to alter the color of the material in which they are incorporated. The use of ordinary colorant particles of a size greater than 200 mesh results in the disintegration of the particle during processing of the base material. This causes undesirable effects such as uncontrollable smearing and discoloration of the base material by the disintegrated particle.

A popular method heretofore used employed small amounts of metal flakes of appropriate size for the desired speckled effect. Difficulties are encountered in incorporating these flakes in the base material. Jamming of the metering pumps and fouling of the metering gears occurs because of a tendency of the metal flakes to pack therein. In addition, since sparks may be generated there is an explosion hazard during the blending of the metal particles. The final product obtainable with metal flakes is not wholly satisfactory for several reasons. The colors of metal flakes available are limited and not easily altered to provide a greater variety of speckled effects. Similarly, metal flakes are not easily wetted by plastics, which fact, along with their relatively great density, hinders formation of a uniform dispersion. Moreover, it is difficult to obtain a metal-speckled plastic surface free from protruding metal flakes.

It is, therefore, an object of the present invention to overcome the deficiencies of the prior art methods in the formation of speckled thermoplastic articles.

It is another object of the present invention to provide a wide variety of speckled compositions having improved surface characteristics.

According to the present invention we have found that by uniformly distributing throughout a normally solid thermoplastic resin composition, prior to the final forming thereof, about 0.05 to about 5.0 parts by weight of a colored particulate thermosetting resin, or a colored particulate composition comprising one or more thermosetting resins per 100 parts by weight of the thermoplastic resin composition, said particulate material being substantially insoluble in the thermoplastic resin, we obtain as a final product, a formed article which is uniformly speckled with sharply defined, discrete centers of color.

When using particles of a colored thermosetting resin no packing occurs in the metering equipment and there is no danger of generating sparks during the blending operation. A limitless number of color combinations can be produced and better dispersions can be obtained with the thermosetting particles than were possible using metal flakes. The thermosetting resin can be used with its natural color if desired or the color may be changed by the use of pigments, dyes and fillers.

The introduction of the thermosetting resin particles can be made at any stage of the manufacturing process prior to the final forming operation. A uniform mixture of the thermosetting particles and thermoplastic resin composition is essential for production of satisfactorily speckled products. One method of obtaining a uniform mixture comprises incorporating uncured thermosetting particles in the monomer or mixture of monomers which are to be polymerized to the base thermoplastic resin prior to or during the polymerizing operation. Curing of the thermosetting particles is then accomplished in the polymerization equipment. The thermoplastic resin composition obtained from this polymerization procedure contains integral thermosetting particles in uniform distribution. Alternatively, the thermosetting particles can be mixed with the thermoplastic resin and other components and said mixture can then be hot compounded and processed by any of the procedures generally used to mix and compound conventional thermoplastic resin compositions. The curing of the particles can be accomplished during the processing or the particles can be cured before mixing with the thermoplastic composition. Another alternative method comprises dry-blending the particles of the thermosetting resin with granules or pellets of the thermoplastic resin composition. In this method the uniform distribution of the thermosetting particles throughout the thermoplastic composition is effected by the mixing action provided by the molding, extruding, calendering, or other operations used to form the final product.

As indicated by the above-suggested methods the exact manner in which the thermosetting particles are introduced into and dispersed throughout the thermoplastic resin composition prior to the final forming operation is not critical. All methods which assure a thorough blending and a uniform mixture of the components are suitable.

The stage of cure, i.e., fusible or infusible, is not critical during processing providing the particles are insoluble in the thermoplastic composition. Preferably, the thermosetting particles can be cured before incorporation in the composition.

The thermoplastic resins employed in this invention as a base material are those normally solid polymers produced from any olefinically unsaturated monomer. For example, the homopolymers or interpolymers of styrene, ethylene, vinyl chloride and the like are suitable. Polyamides, cellulose derivatives such as ethyl cellulose, cellulose esters such as the butyrate, acetate, nitrate and the like can also be employed in this invention. In addition, compositions of such resins containing fillers, reinforcing agents, colorants, stabilizers, lubricants, plasticizers, processing aids and other modifiers such as are normally employed in thermoplastic resin compositions can also be employed.

The thermosetting resins suitable for use in the present invention are particulate forms of phenolics, ureas, melamines, alkyds, polyesters, epoxies and the like and compositions thereof. These resins and compositions may be pigmented if desired. Preferred for most satisfactory results are phenolic resins and alkyd resins and compositions thereof. The concentration of thermosetting particles in the compositions of this invention can range from about 0.05 to about 5.0 parts by weight per 100 parts by weight of the thermoplastic resin composition. Concentrations above or below these limits result in a final product with the contrasting particles either too close together or too far apart to have a pleasant appearance. Concentrations ranging from 0.1 to 1.0 part by weight of thermosetting particles per 100 parts by weight of thermoplastic resin composition are preferred for an optimum speckled effect.

The thermosetting resin can have a particle size as large as about 10 mesh. Particles greater than about 10 mesh cause surface pitting, are difficult to disperse satisfactorily, and may restrict the flow of the thermoplastic resin through the mold gates. The minimum particle size suggested for use in this invention is approximately 200 mesh. Substantially all, i.e. 98% of the particles used should be retainable on a 200 mesh screen since particles below this minimum are not ordinarily visible as a distinct center of color but rather appear as a discoloration of the base material. Such discoloration causes a reduction in the color contrast obtainable between the remainder of the particles and the base material. The particular speckled effect desired will determine the sizes of the particles employed. An additional variation of the speckled effect produced can be obtained by using various proportions of different sized particles. It is preferred to use particles not larger than about 80 mesh in size. Such particles most readily permit formation of a uniform dispersion and cause a minimum of surface pitting. Particles larger than about 80 mesh and less than about 10 mesh are suitable for compositions which are to be compression molded or injection molded through relatively large diameter gates or the like. The greater adaptability of particles smaller than about 80 mesh, is shown, for example, in that they do not restrict flow even through narrow mold gates.

The thermosetting resin particles can be varied in size and color to permit a wide range of speckled effects. In order to obtain the clearly distinct, discrete centers of varigated color which are an outstanding feature of the present invention, the thermosetting resin composition is colored with a dye or pigment which will not bleed or dissolve substantially in the thermoplastic material. Bleeding or dissolving of the coloring agent would negate an advantage offered by the present invention, namely, clearly defined specks of a color contrasting with a pure solid color background.

To further insure that a spot of color of the desired size and shape is obtained it is preferred to partially or completely cure the thermosetting resin composition prior to its incorporating in the thermoplastic resin. The curing or thermosetting process causes cross-linkages to develop within the polymeric thermosetting masses. The greater the number of cross-linkages the more reduced is the plasticity of the material. When extensively cross-linked or substantially cured, thermosetting particles can be processed with the thermoplastic material through the hot compounding and forming operations without undergoing changes in shape due to flow. The maintaining of the thermosetting particles' size and shape permits rigid control of the specks produced in the final product. If a comet-like speckled effect is desired, particles of material which have been only slightly cross-linked or partially cured and which, therefore, still retain some plasticity, are used. Unlike large colorant particles, these colored thermoset particles do not disintegrate when compounded and processed. The use of the thermosetting resins hereinbefore described, singly or in combination, permits, therefore, not only an unlimited choice of colors but a number of different geometric effects as well.

The possible uses of plastic products speckled with the superior speckling materials herein described are as unlimited as the uses of thermoplastics themselves. These speckling effects can be used to increase the attractiveness of both molded and extruded plastic products.

The following examples are illustrative of our invention.

*Example I*

A wood flour filled, phenolic resin molding compound pigmented with carbon black was ground and screened; 0.75 part by weight of the uncured particles which passed through a U.S. 30 mesh screen and were retained on a U.S. 100 mesh screen and 100 parts by weight of a commercial general purpose, white, polystyrene molding compound were placed in the hopper of an injection molding machine and mixed therein by hand. The mixture was then injection molded into wall tiles 4 inches square and 50 mils thick with a stock temperature of 250° C. and a mold temperature of 50° C. on a 20 second cycle.

These molded white tiles had an attractive and uniform speckled black effect. The surface of the tiles was smoother and contained fewer protruding particles than the surface of similar tiles which had been speckled in the same manner except that bronze and aluminum flakes were used. In addition, greater contrast with the white polystyrene base was provided by the phenolic particles than by the bronze and aluminum flakes.

*Example II*

A wood flour filled, one-step phenolic resin molding material pigmented with carbon black was ground and screened; 0.5 part by weight of these uncured particles which passed through a U.S. 16 mesh and were retained on a U.S. 50 mesh screen and 100 parts by weight of diced pink, general purpose polystyrene molding material were blended together by tumbling. This blend was passed through a twin-screw compounder having 2″ by 3′ compounding screws. Water was circulated through the rear section of the compounder barrel to keep the temperature below 90° C. The remainder of the barrel was kept at 180° C. The blended material was put through the compounder at the rate of 150 lbs./hr., and issued therefrom at a temperature of 210° C. The speckled polystyrene compound was cooled, granulated and injection molded at a stock temperature of 250° C. and a mold temperature of 50° C. to produce tiles 4 inches square by 50 mils thick. They had a uniform black speckle pattern on the pink background. Again the tile surface was superior in appearance and to the touch to that obtained using bronze and aluminum flakes.

*Example III*

A one step, wood flour filled phenolic resin molding composition pigmented with carbon black was ground and screened. The particles which passed through a U.S. 100 mesh and were retained on a U.S. 150 mesh screen were cured by heating for one hour in a 150° C.

oven. Twenty parts by weight of these particles were dispersed by agitation in a solution consisting of 27 parts by weight of polystyrene dissolved in 53 parts by weight of styrene monomer. This dispersion was metered with a metering pump into a polystyrene molding composition as it was being produced in a continuous, polystyrene compound manufacturing line. In this line polymerizable monomers are continuously polymerized in autoclaves. The products of the polymerization are then discharged into a continuous stripping and compounding mill wherein the volatile components are removed and other components of the composition, e.g. colorants etc. are introduced into and thoroughly mixed in the plastic mass. The composition is then cooled and granulated.

The above-cited dispersion was metered into the stripping-compounding mill at a rate sufficient to give a final product containing 0.5% by weight phenolic particles. White, pink, blue, gray, tan and yelloy polystyrene compositions were speckled in the same manner. In each instance there was no staining or discoloration of the thermoplastic product by the incorporated particles. In addition, the metering pump did not jam or clog during the addition of the dispersed particles. By contrast, an attempt to add similarly dispersed bronze and aluminum flakes of the same particle size and in the same concentration by the identical method was unsuccessful due to jamming of the metering pump by the metal flakes.

The speckled polystyrene compositions produced in this example were injection molded into tiles 4 inches square by 50 mils thick at a stock temperature of 250° C. and a mold temperature of 50° C. Each of the tiles possessed an attractive, uniform speckled pattern and excellent surface appearance. All of the particles retained their size and shape. This maintenance of particle integrity was more easily achieved and more satisfactory than in Examples I and II wherein the phenolic particles had not been cured prior to extrusion.

*Example IV*

A pink melamine resin molding compound was ground, screened and the particles passing through 100 mesh and retained on a 200 mesh screen were cured by heating in a 90° C. circulating air oven for two days. 0.5 part by weight of the cured melamine resin molding material particles were added to a 100 parts by-weight-sample of white polystyrene dice such as used in Example I and white rubber modified, high impact grade polystyrene molding compound. Compounding and extrusion procedures for the modified and the unmodified polystyrene were the same as those in Example II. The two sets of white tile produced exhibited sharply defined centers of pink color, distributed uniformly throughout. Again each of the tiles had an excellent surface and an attractive appearance.

Unless otherwise indicated the term "thermoplastic resin composition" as used herein and in the claims refers to one such resin or a mixture of such resins. Similarly the term "thermosetting resin composition" unless otherwise indicated refers to one or a mixture of such molding materials.

The phenolic molding material used in Example I was compounded by hot-rolling a mixture composed of the following parts by weight:

|  | Parts |
| --- | --- |
| Solid novolak condensation product of 1 mol of phenol and 2.5 mols of formaldehyde | 45.5 |
| Hexamethylene tetramine | 6.5 |
| Lime | 2.5 |
| Lubricant | 1.0 |
| Nigrosine | 1.0 |
| Clay | 12.5 |
| Wood flour | 30.0 |

The particulate phenolic molding material used in Example II was prepared by hot-rolling a mixture composed of the following parts by weight:

|  | Parts |
| --- | --- |
| Solid resole (alkaline-catalyzed condensation product of phenol and formaldehyde) | 56 |
| Lime | 4.5 |
| Mold lubricant | 0.5 |
| Carbon black | 2.5 |
| Wood flour | 35.5 |

The phenolic molding material used in Example III was compounded by hot-rolling a mixture composed of the following parts by weight:

|  | Parts |
| --- | --- |
| Solid alkaline-catalyzed phenol formaldehyde resole resin | 54 |
| Lime | 2.0 |
| MgO | 3.0 |
| Lubricant | 1.5 |
| Carbon black | 2.5 |
| Wood flour | 37 |

The melamine molding compound used in Example IV was a commercial molding material composed of a resinous melamine-formaldehyde condensation product and an alpha cellulose filler and marketed by the American Cyanamid Company under the trademark designation GB–465.

What is claimed is:

1. A composition of matter decoratively speckled with discrete, well-defined centers of color comprising 100 parts by weight of a normally solid synthetic thermoplastic resin composition and 0.05 to 5.0 parts by weight of a different color particulate, heat-hardened thermosetting resin composition having a particle size of from 10 to 200 U.S. mesh, said thermosetting resin composition being substantially insoluble in said thermoplastic resin composition.

2. A composition of matter decoratively speckled with discrete well-defined centers of color comprising 100 parts by weight of a normally solid synthetic thermoplastic resin composition and 0.05 to 5.0 parts by weight of a different color particulate, heat hardenable thermosetting resin composition having a particle size of from 10 to 200 U.S. mesh, said thermosetting resin composition being substantially insoluble in said thermoplastic resin composition.

3. The composition of claim 1 wherein the thermosetting resin composition has a particle size between about 80 and 200 U.S. mesh.

4. The composition of claim 1 wherein the thermosetting resin composition has a particle size between about 10 and 200 U.S. mesh and is present in amounts ranging from 0.1 to 1.0 part by weight per 100 parts by weight of the thermoplastic resin composition.

5. The composition of claim 1 wherein the thermosetting resin composition has a particle size between about 80 and 200 U.S. mesh and is present in amounts ranging from 0.1 to 1.0 part by weight per 100 parts by weight of the thermoplastic resin composition.

6. A uniformly speckled product formed from the composition comprising 100 parts by weight of a normally solid synthetic thermoplastic resin composition and between about 0.05 and 5.0 parts by weight of a different color particulate, heat hardened thermosetting resin composition having a particle size of from 10 to 200 U.S. mesh.

7. The product of claim 6 wherein the heat hardened particles have a size ranging from about 80 to 200 U.S. mesh.

8. A uniformly speckled molded product comprising 100 parts by weight of a normally solid synthetic thermoplastic resin composition and uniformly incorporated therein between about 0.1 and 1.0 part by weight of a different color particulate, heat hardened thermosetting resin composition having a particle size of from 10 to 200 U.S. mesh.

9. The product of claim 8 wherein the thermoset particles have a size ranging from about 80 to 200 U.S. mesh.

10. The composition of claim 1 wherein the thermoplastic resin composition is a styrene resin composition and the thermosetting resin composition is a phenolic resin composition.

11. The product of claim 6 wherein the thermoplastic resin composition is a styrene resin composition and the thermosetting resin composition is a phenolic resin composition.

12. The composition of claim 1 wherein the thermoplastic resin composition is a polyethylene resin composition and the thermosetting resin composition is a phenolic resin composition.

13. The composition of claim 1 wherein the thermoplastic resin composition is a poly(vinyl chloride) resin composition and the thermosetting resin composition is a phenolic resin composition.

References Cited in the file of this patent

UNITED STATES PATENTS

| | | |
|---|---|---|
| 2,385,256 | Britton et al. | Sept. 18, 1945 |
| 2,466,040 | Myerson | Apr. 5, 1949 |
| 2,668,803 | Lantz et al. | Feb. 9, 1954 |
| 2,773,044 | Vesce | Dec. 4, 1956 |
| 2,791,573 | Bangs et al. | May 7, 1957 |
| 2,987,496 | Simpson | June 6, 1961 |

FOREIGN PATENTS

| | | |
|---|---|---|
| 579,181 | Great Britain | July 25, 1946 |
| 617,605 | Great Britain | Feb. 9, 1949 |